(12) United States Patent
Shoham et al.

(10) Patent No.: US 7,561,589 B2
(45) Date of Patent: Jul. 14, 2009

(54) VIRTUAL ADDRESS STORAGE WHICH MAY BE OF PARTICULAR USE IN GENERATING FRAGMENTED PACKETS

(75) Inventors: Doron Shoham, Shoham (IL); Rami Zemach, Herzeliya (IL); Alon Ratinsky, Hadera (IL); Sarig Livne, Tel Aviv (IL)

(73) Assignee: Cisco Technology, Inc, San Jose, CA (US)

( * ) Notice: Subject to any disclaimer, the term of this patent is extended or adjusted under 35 U.S.C. 154(b) by 879 days.

(21) Appl. No.: 11/065,118

(22) Filed: Feb. 23, 2005

(65) Prior Publication Data
US 2006/0209862 A1 Sep. 21, 2006

(51) Int. Cl.
*H04L 12/56* (2006.01)
(52) U.S. Cl. ..................................... 370/412
(58) Field of Classification Search ................. 370/412
See application file for complete search history.

(56) References Cited

U.S. PATENT DOCUMENTS

| | | | |
|---|---|---|---|
| 4,755,986 A | 7/1988 | Hirata | |
| 5,450,411 A | 9/1995 | Heil | |
| 5,870,394 A * | 2/1999 | Oprea | ........................ 370/392 |
| 5,896,501 A | 4/1999 | Ikeda et al. | |
| 5,949,780 A | 9/1999 | Gopinath | |
| 6,032,190 A | 2/2000 | Bremer et al. | |
| 6,128,666 A | 10/2000 | Muller et al. | |
| 6,216,199 B1 * | 4/2001 | DeKoning et al. | .............. 711/3 |
| 6,249,852 B1 * | 6/2001 | Benayon et al. | ............. 711/170 |
| 6,377,577 B1 | 4/2002 | Bechtolsheim et al. | |
| 6,658,002 B1 | 12/2003 | Ross et al. | |
| 6,725,326 B1 | 4/2004 | Patra et al. | |
| 6,735,173 B1 | 5/2004 | Lenoski et al. | |
| 6,798,783 B1 | 9/2004 | Rangarajan et al. | |
| 6,832,261 B1 | 12/2004 | Westbrook et al. | |
| 7,093,027 B1 | 8/2006 | Shabtay et al. | |
| 7,197,597 B1 | 3/2007 | Scheid et al. | |
| 7,327,749 B1 * | 2/2008 | Mott | ........................... 370/413 |
| 2001/0049744 A1 | 12/2001 | Hussey et al. | |

(Continued)

FOREIGN PATENT DOCUMENTS

EP    1085723  A2    5/2003

(Continued)

*Primary Examiner*—Edan Orgad
*Assistant Examiner*—Blanche Wong
(74) *Attorney, Agent, or Firm*—The Law Office of Kirk D. Williams (57) ABSTRACT

A virtual address storage system, which may be of particular used in generating fragmented packets, is implemented using a linked list of data segments. Multiple storage segments linked together in a linked list data structure are maintained to represent a virtual contiguous block of storage to be accessed based on a virtual address. Virtual address to corresponding data segment pointer associations are maintained for identifying a data segment corresponding to a particular address within the address space. In response to an identified address in the address space, a particular closest dynamic recently used association is identified and used to traverse to the desired data segment (e.g. rather than traversing from the beginning of the linked list), and one of the dynamic recently used associations is updated. A packet can be stored in this address space along with newly generated packet headers and tails for the multiple fragmented packets.

21 Claims, 8 Drawing Sheets

U.S. PATENT DOCUMENTS

| | | |
|---|---|---|
| 2003/0231631 A1 | 12/2003 | Pullela |
| 2004/0037322 A1 | 2/2004 | Sukonik et al. |
| 2004/0039787 A1 | 2/2004 | Zemach et al. |
| 2004/0117790 A1 | 6/2004 | Rhine |
| 2005/0265328 A1 | 12/2005 | Bettink |
| 2006/0168405 A1 | 7/2006 | Shoham et al. |
| 2006/0221823 A1 | 10/2006 | Shoham et al. |
| 2006/0239258 A1 | 10/2006 | Kogan et al. |

FOREIGN PATENT DOCUMENTS

| | | |
|---|---|---|
| WO | 02/09307 A1 | 1/2002 |
| WO | 02/39667 A2 | 5/2002 |

* cited by examiner

VIRTUAL ADDRESS STORAGE WHICH MAY BE OF PARTICULAR USE IN GENERATING FRAGMENTED PACKETS

TECHNICAL FIELD

One embodiment of the invention relates to communications and computer systems, especially routers, packet switching systems, and other devices; and more particularly, one embodiment relates to a virtual address storage system implemented using a linked list of data segments, which may be of particular used in generating fragmented packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards packets. For example, an enqueuing component of such a device receives streams of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are typically maintained in a separate memory. Once the entire packet is written into memory, the packet becomes eligible for processing, and an indicator (e.g., a packet handle) of the packet is typically placed in an appropriate destination queue for being serviced according to some scheduling methodology for packet processing. Prior systems may split the packet into multiple pieces (e.g., the head, the packet payload data and tail) and store them in multiple memories. This can be inefficient when more than the packet header is required for packet processing, such as when fragmenting packets. When this packet processing is complete, the packet(s) are then gathered for sending (e.g., another processing function to build the processed packet to be forwarded based on the packet handle), and then forwarded, and the memory previously required for storing the sent packet(s) becomes available for storing new information.

SUMMARY

Disclosed are, inter alia, methods, apparatus, data structures, computer-readable media, and mechanisms, for a virtual address storage system, which may be of particular used in generating fragmented packets. One embodiment implements a virtual address storage system using a linked list of data segments. Multiple storage segments linked together in a linked list data structure are maintained to represent a virtual contiguous block of storage to be accessed based on a virtual address within the virtual space represented by the virtual address storage system. Multiple associations between a virtual address and a corresponding data segment pointer associations are typically maintained for readily identifying data segments corresponding to particular addresses within the address space. In response to an identified address in the address space, a particular closest dynamic recently used association is identified and used to traverse to the desired data segment (e.g. rather than traversing from the beginning of the linked list), and one of the dynamic recently used associations is updated. One embodiment stores a packet in this virtual address space, generates and adds additional packet headers and tails therein for the multiple fragmented packets.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Disclosed are, inter alia, methods, apparatus, data structures, computer-readable media, and mechanisms, for a virtual address storage system implemented using a linked list of data segments, which may be of particular used in generating fragmented packets.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for a virtual address storage system implemented using a linked list of data segments, which may be of particular used in generating fragmented packets. One embodiment maintains multiple storage segments linked together in a linked list data structure to represent a virtual contiguous block of storage to be accessed based on a virtual address within an address space corresponding to the virtual contiguous block of storage. Multiple virtual address to corresponding data segment pointer associations are maintained for directly identifying a data segment corresponding to a particular address within the address space, with these associations including dynamic recently used associations. In response to an identified address in the address space, a lookup operation is performed based on the identified address in the maintained associations to evaluate the dynamic recently used associations in order to identify a closest data segment pointer which is closest, but prior in said linked list of the linked list data structure, to a particular data segment corresponding to the identified address. The linked list data structure is then traversed from the storage segment identified by the closest data segment pointer to the particular data segment, with this data then being accesses (e.g., read, written, manipulated, updated, etc.). One of the dynamic recently used associations is updated to reflect said accessing data.

In one embodiment, the updated association includes the closest data segment pointer. In one embodiment, the updated association does not include the closest data segment pointer. In one embodiment, the accessing of the data includes accessing a last particular data segment, and the updating of the association includes identifying a particular association to update based on the last particular data segment, and then updating that particular association. One embodiment maintains multiple different address spaces, which are individually selectable based on a context identifier.

One embodiment includes storing packet data, multiple packet headers and multiple packet tails in the virtual contiguous block of storage. In one embodiment, the packet data is stored in a middle portion of the virtual contiguous block of storage; and said packet headers are stored before the middle portion and said packet tails are stored after the middle portion. One embodiment includes a packet processor configured to receive packets, to store packets in a virtual address storage system, to retrieve packets from the virtual address storage system, and to forward packets the virtual address storage system.

In a single processor system where only a single packet is processed at a time, storage is typically allocated which is large enough to hold a maximum sized packet. In a system which has n multiple processors in which each processor handles a single packet, then there must be storage for at least n maximum sized packets, which can require a very large memory (and even a multiple larger if a packet processor can process more than one packet at a time). By breaking each packet into small data segments (linked in a hardware supported linked list), one embodiment is able to store each packet in a storage device such that each packet consumes only its actual size. In one embodiment, the hardware mechanism hides these details from the processors (or software processes) such that each believes it has a contiguous virtual memory space in this common storage device, and the hardware translation mechanism translates each processor's virtual address into physical address using identifiers of the processors and the dynamic recently used associations (e.g., virtual to physical address translations) that it maintains for each processor in order to increase its performance.

Figure 1A:
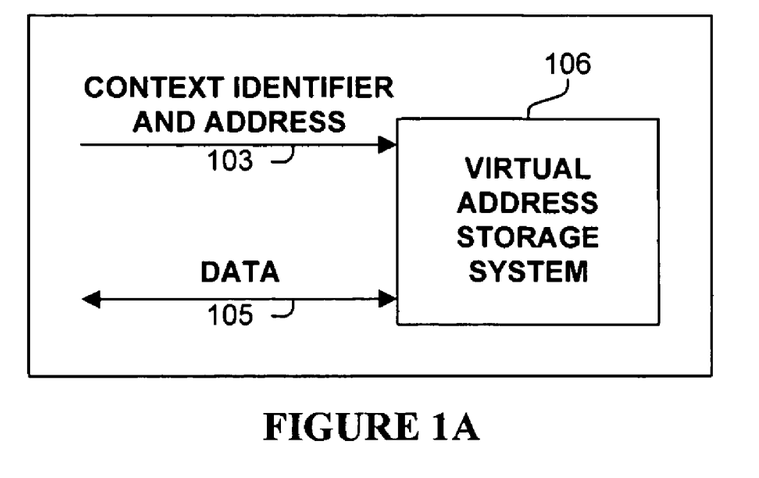
FIG. 1A is a block diagram of a configuration used in one embodiment.

FIG. 1A is a block diagram of a configuration of one embodiment. A virtual address storage system 106 is used to access (e.g., store, retrieve, manipulate, etc.) data 105 based on a received virtual address 103 within the virtual address space. One embodiment also uses context identifiers 103 to identify which of multiple address spaces to use.

Figure 1B:
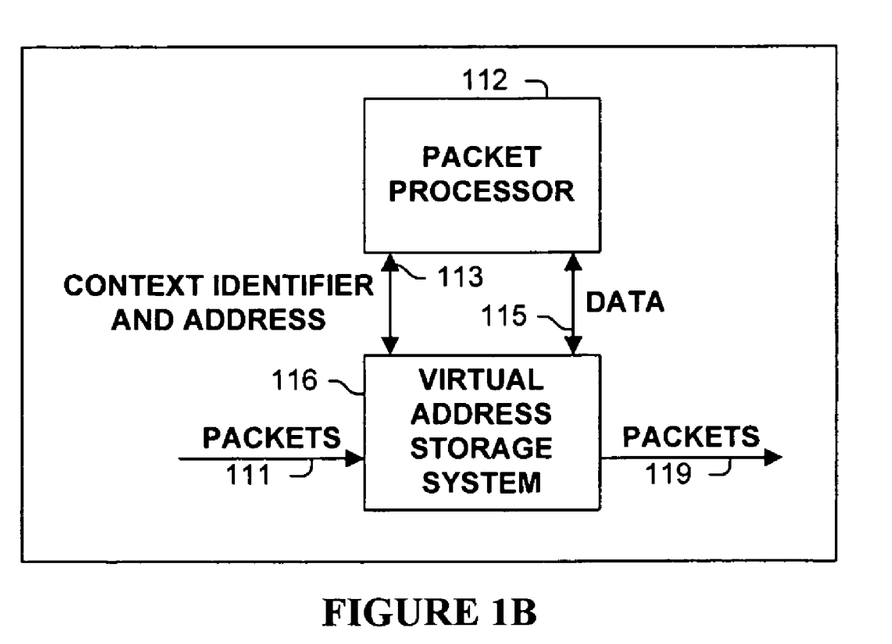
FIG. 1B is a block diagram of a configuration used in one embodiment.

FIG. 1B is a block diagram of a configuration of one embodiment. A virtual address storage system 116 is used to access (e.g., store, retrieve, manipulate, etc.) data 115 based on a received virtual address 113 within the virtual address space. One embodiment also uses context identifiers 113 to identify which of multiple address spaces to use. Packets 111 are received into virtual address storage system 116, which are then typically manipulated by packet processor 112, with the processed packets 119 being forwarded from virtual address storage system 116.

Figure 1C:
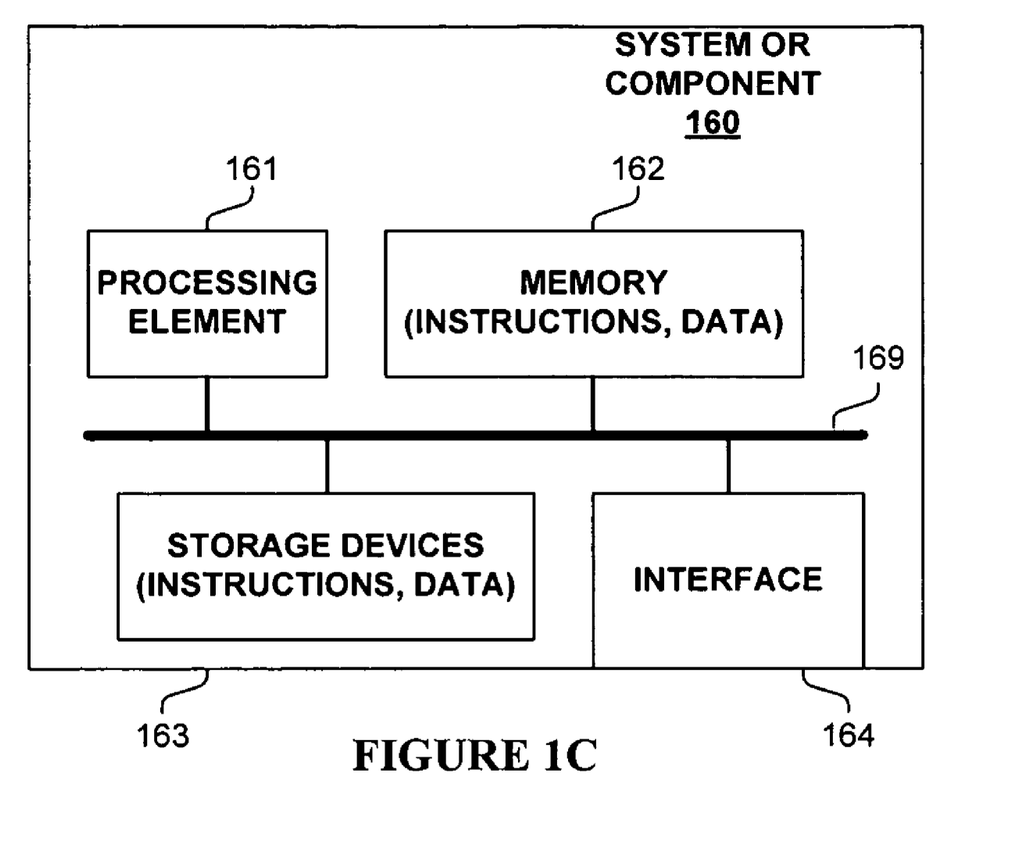
FIG. 1C is a block diagram of a configuration used in one embodiment.

FIG. 1C is a block diagram of a system or component 160 used in one embodiment in implementing and/or in conjunction with a virtual address storage system. In one embodiment, system or component 160 performs one or more processes corresponding to one of the flow diagrams illustrated or otherwise described herein.

In one embodiment, component 160 includes a processing element 161 (e.g., a processor, customized logic, etc.), memory 162, storage devices 163, and an interface 164 for receiving and sending packets, items, and/or other information, which are typically coupled via one or more communications mechanisms 169 (shown as a bus for illustrative purposes.) Various embodiments of component 160 may include more or less elements. The operation of component 160 is typically controlled by processing element 161 using memory 162 and storage devices 163 to perform one or more scheduling tasks or processes. Memory 162 is one type of computer-readable medium, and typically comprises random access memory (RAM), read only memory (ROM), flash memory, integrated circuits, and/or other memory components. Memory 162 typically stores computer-executable instructions to be executed by processing element 161 and/or data which is manipulated by processing element 161 for implementing functionality in accordance with the invention. Storage devices 163 are another type of computer-readable medium, and typically comprise solid state storage media, disk drives, diskettes, networked services, tape drives, and other storage devices. Storage devices 163 typically store computer-executable instructions to be executed by processing element 161 and/or data which is manipulated by processing element 161 for implementing functionality in accordance with the invention.

Figure 2A:
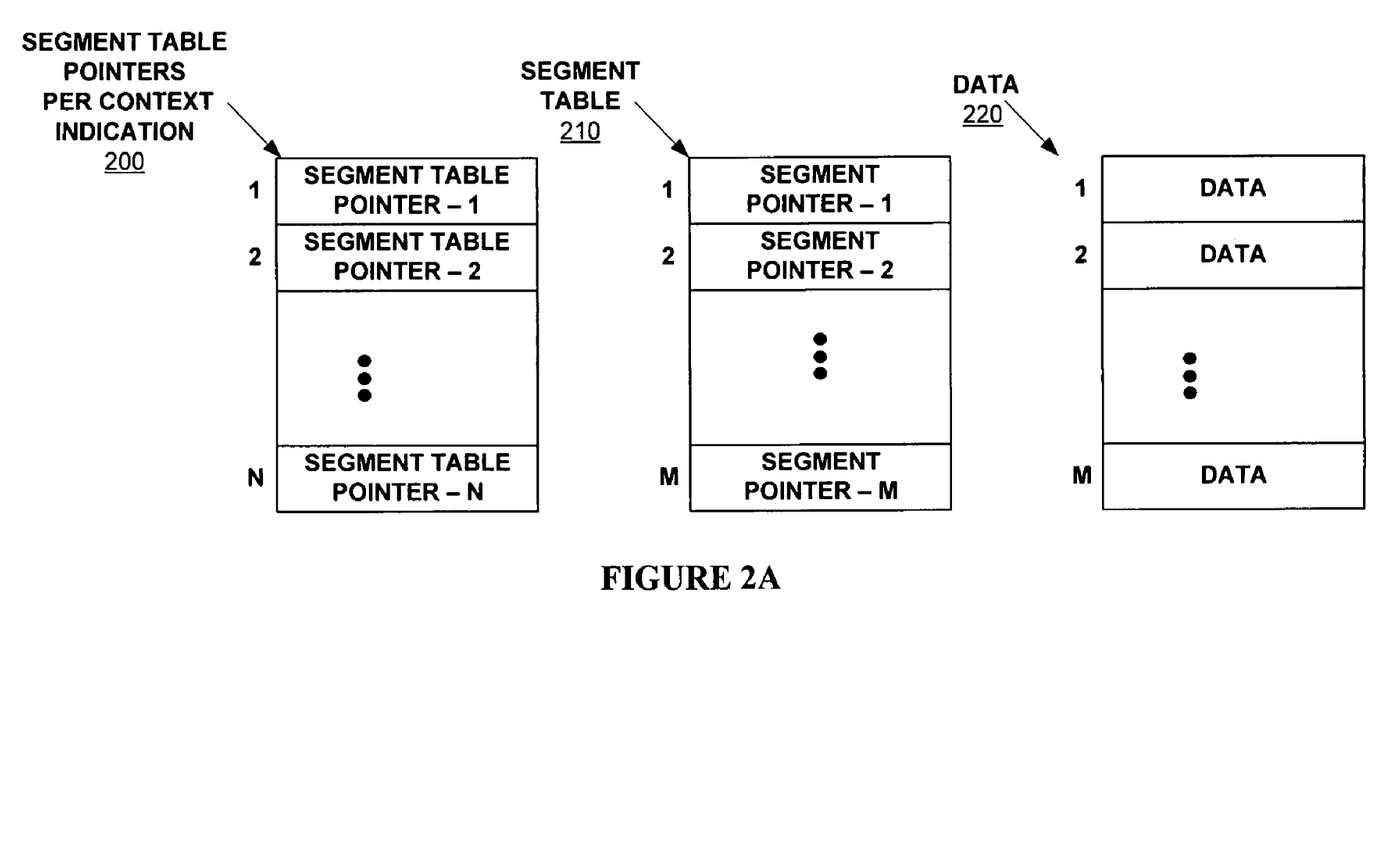
FIG. 2A is a block diagram illustrating a data structure used in one embodiment.

FIG. 2A is a block diagram illustrating a data structure used in one embodiment in implementing a virtual address storage system. A segment table pointers per context indication data structure 200 is used to identify a virtual address space based on a context indication (e.g., a value). One embodiment uses an array of pointers to various segment tables 210 (e.g., one for each context identifier). One embodiment implements a linked list data structure using a segment table 210 which indicates the next segment in the link by its value, with the data stored in data table 220, typically in corresponding positions.

For example, assume for a context indication of seven, a first segment is at position three and a next segment is at position five. This is represented in one embodiment by the value in segment table pointers per context indication data structure 200 at position seven having a value of three, and the value at position three in corresponding segment table 210 is five. The last segment in a segment table 210 typically has a value of null to indicate the end of the linked list.

Figure 2B:
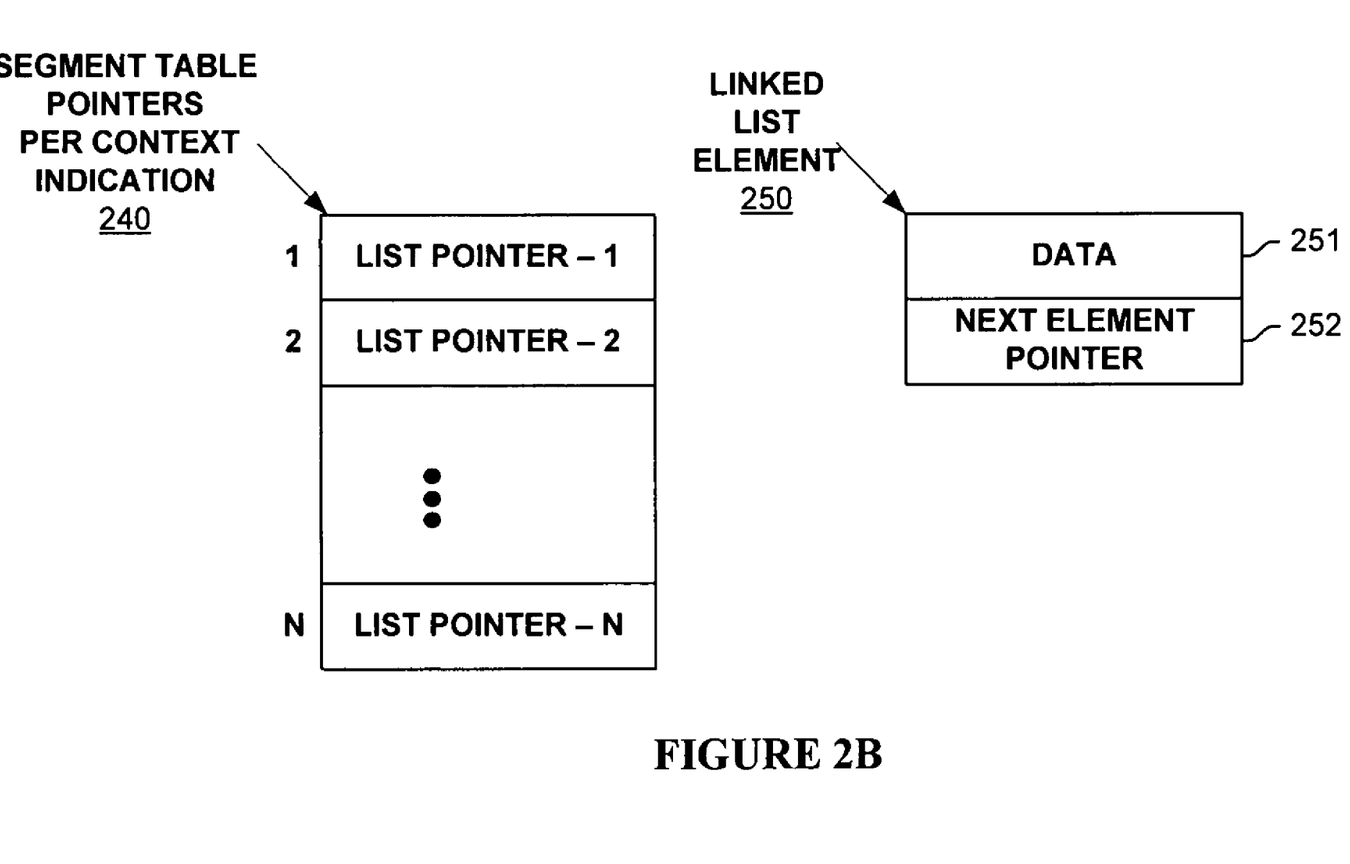
FIG. 2B is a block diagram illustrating a data structure used in one embodiment.

FIG. 2B is a block diagram illustrating a data structure used in one embodiment, which uses as linked list elements 250 which include a data portion 251 and a next element pointer 252 to build the linked list. Segment table pointers per context indication data structure 240 points to the first linked list element 250 for each corresponding context indication.

Figure 3:
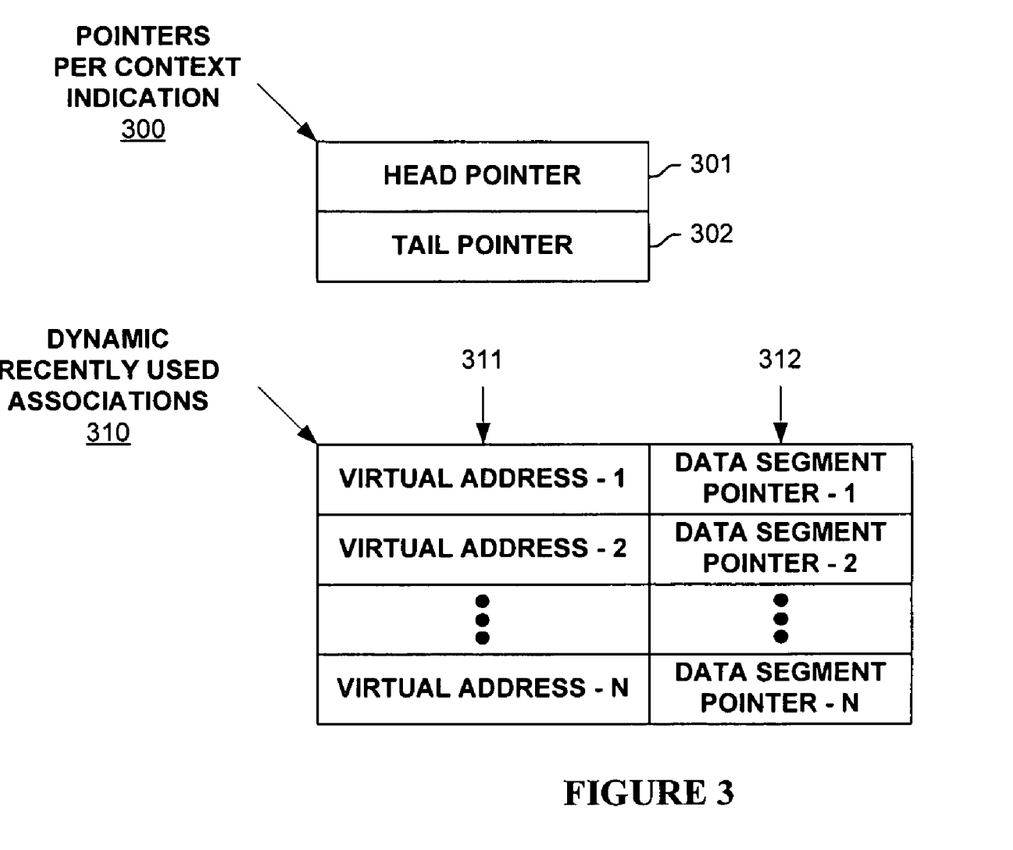
FIG. 3 is a block diagram illustrating a data structure used in one embodiment.

FIG. 3 is a block diagram illustrating a data structure used in one embodiment. One embodiment maintains a data structure 300 for each context indication a head pointer 301 and a tail pointer 302 for its corresponding linked list data structure. One embodiment maintains a data structure 310 for maintaining dynamic recently used associations between virtual address values 311 in the virtual address space represented for a corresponding context and their corresponding data segments (e.g., by linked list data segment pointers 312). Thus, the linked list element for a particular virtual address stored in associations data structure 310 can be readily accessed. One embodiment maintains recently used associations as they are typically indicative of next accessed data segments (especially when processing data sequentially). By using these associations, data segments can typically be accessed faster than by traversing the linked list starting at the first element each time.

One embodiment determines which association in the maintained dynamic recently used associations 310 to replace based on one or more values currently maintained in the dynamic recently used associations 310, which can be contrasted with a mechanism that replaces solely based on a least recently used replacement mechanism. For example, one embodiment replaces the association having the closest virtual address to that of the address being accessed. One embodiment partitions the virtual address space into address ranges and replaces an association within a corresponding range. If more than one association is maintained for an address range, then some selection mechanism (e.g., closest, oldest, closest before, furthest away, least recently used, etc) is used to select among the multiple associations within the corresponding range. One embodiment replaces associations based on their relative positions to the virtual address being accessed. Many different replacement strategies can be employed by one embodiment, and the selection of which may be made based on the memory access pattern of the virtual address space.

Figure 4:
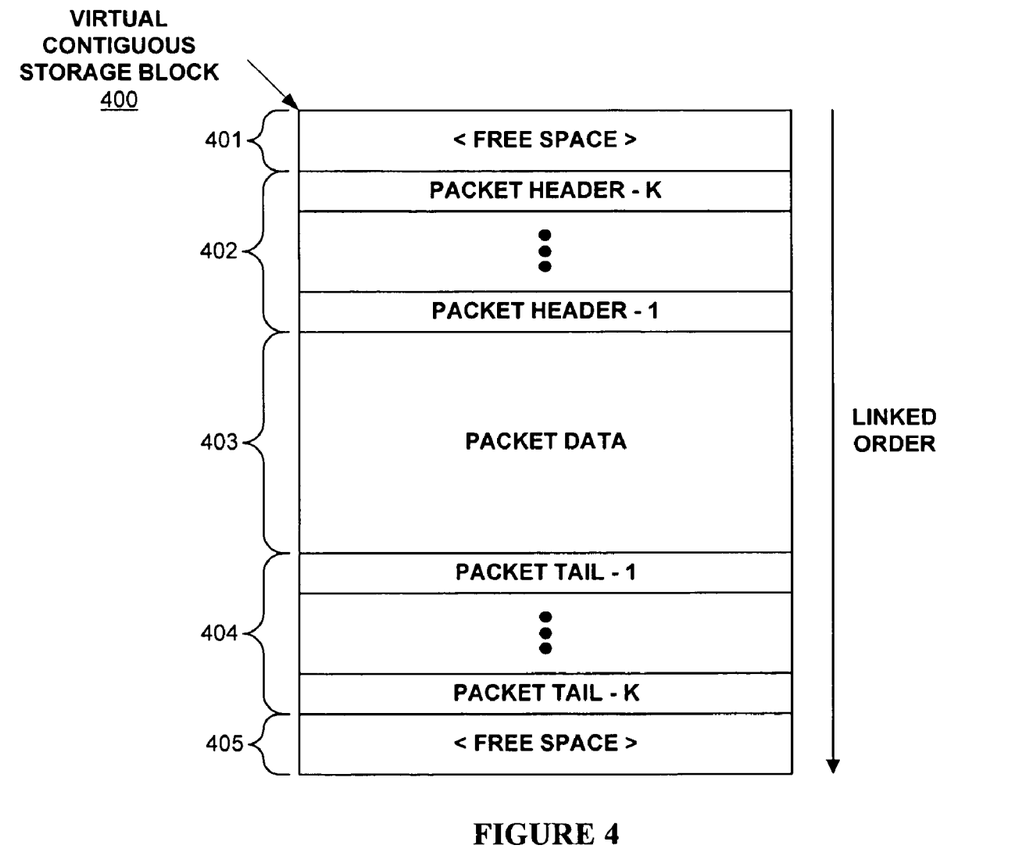
FIG. 4 is a block diagram illustrating the storage of a packet in a virtual address space as performed in one embodiment.

FIG. 4 is a block diagram illustrating the storage of a packet in a virtual address space of a virtual contiguous storage block 400 as performed in one embodiment. As shown, the packet data 403 is stored in the middle of storage block 400, with multiple packet headers 402 stored prior to, and multiple packet tails 404 stored subsequent to, packet data 403 in storage block 400. There may be some free space 401 and 405 also. Additionally, by placing in the middle of the virtual address space, additional free space 401 and/or 405 can be allocated as needed before or after packet data 403. The additional packet headers and tails are typically generated during the processing of the received packet with packet data 403, such as when producing multiple copies of the packet or fragmenting the packet.

Figure 5:
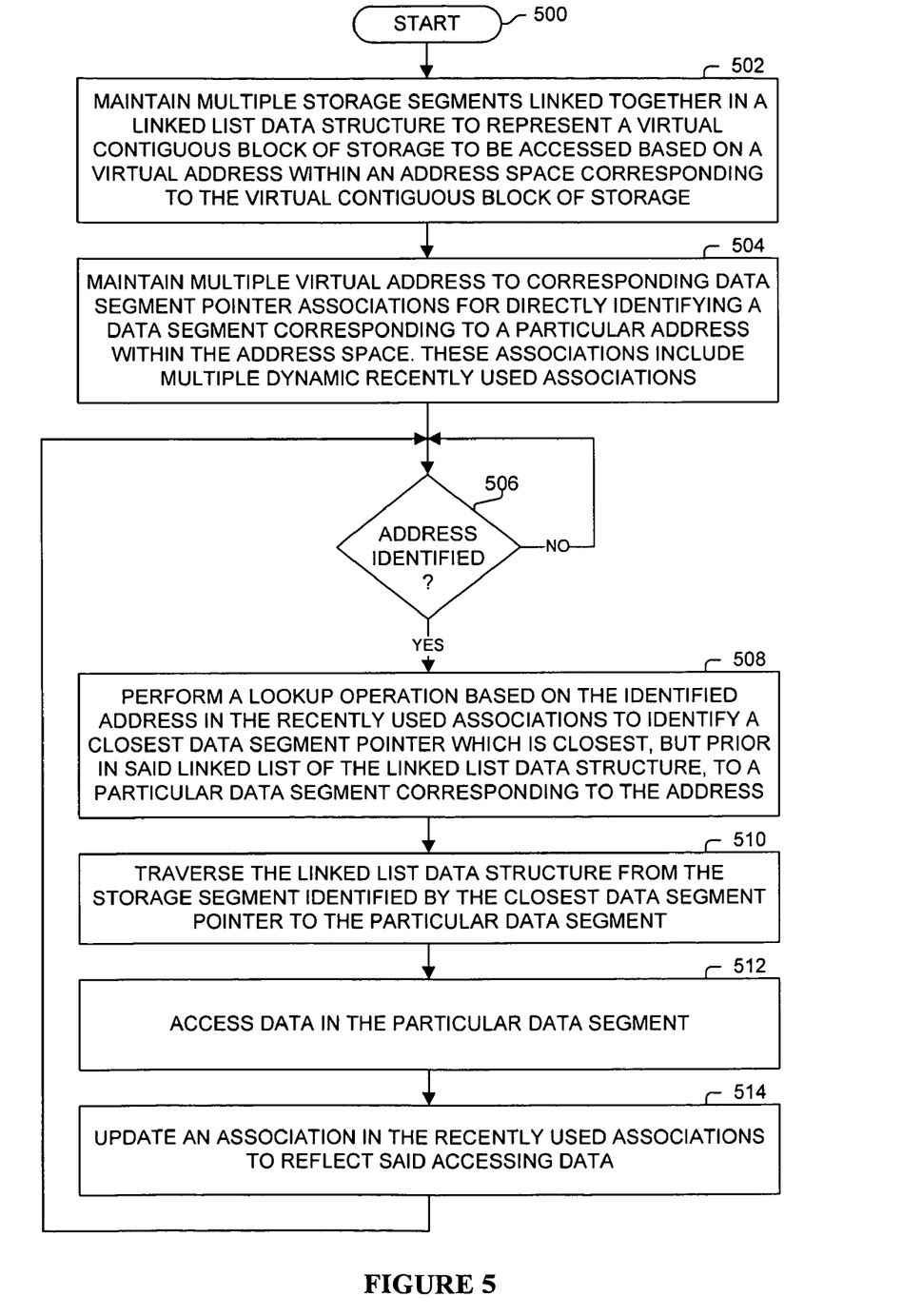
FIG. 5 is a flow diagram illustrating a process performed in one embodiment.

FIG. 5 illustrates a process for accessing storage in a virtual storage system as performed in one embodiment. Processing begins with process block 500. As represented by process block 502, a virtual address space is implemented by maintaining multiple storage segments linked together in a linked list data structure to represent a virtual contiguous block of storage to be accessed based on a virtual address within an address space corresponding to the virtual contiguous block of storage. As represented by process block 504, multiple virtual address to corresponding data segment pointer associations are maintained for directly identifying a data segment corresponding to a particular address within the address space, with these associations including multiple dynamic recently used associations.

As determined by process block 506, in response to an identified address in the address space, a lookup operation is performed in process block 508 based on the identified address in the associations in order to evaluate dynamic recently used associations in order to identify a closest data segment pointer which is closest, but prior in said linked list of the linked list data structure, to a particular data segment corresponding to the identified address. As represented by process block 510, the linked list data structure is traversed from the storage segment identified by the closest data segment pointer to the particular data segment. In process block 512, the data in the particular data segment is accessed; and in process block 514, one of the dynamic recently used associations is updated to reflect said accessing data. Processing returns to process block 506.

Note, the association to be updated in one embodiment is typically smartly selected to be more efficient for subsequent data accesses. Thus, the association updated may or may not be the same association used in reaching the desired data segment, and may or may not be the oldest maintained association (e.g., that typically of a straight aged caching mechanism). For example, one embodiment maintains one or more recently used association in each of multiple areas of the virtual address space (e.g., in the packet header, packet data, and packet tail regions), so as to place a bound on the maximum number of linked list traversals required to reach a desired data segment.

An embodiment may employ one or more of an unlimited number of possible replacement strategies. For example, one embodiment determines which association in the maintained dynamic recently used associations to replace based on one or more values currently maintained in the dynamic recently used associations. One embodiment replaces the association having the closest virtual address to that of the address being accessed. One embodiment partitions the virtual address space into address ranges and replaces an association within a corresponding range. If more than one association is maintained for an address range, then some selection mechanism (e.g., closest, oldest, closest before, furthest away, least recently used, etc) is used to select among the multiple associations within the corresponding range. One embodiment replaces associations based on their relative positions to the virtual address being accessed.

Figure 6:
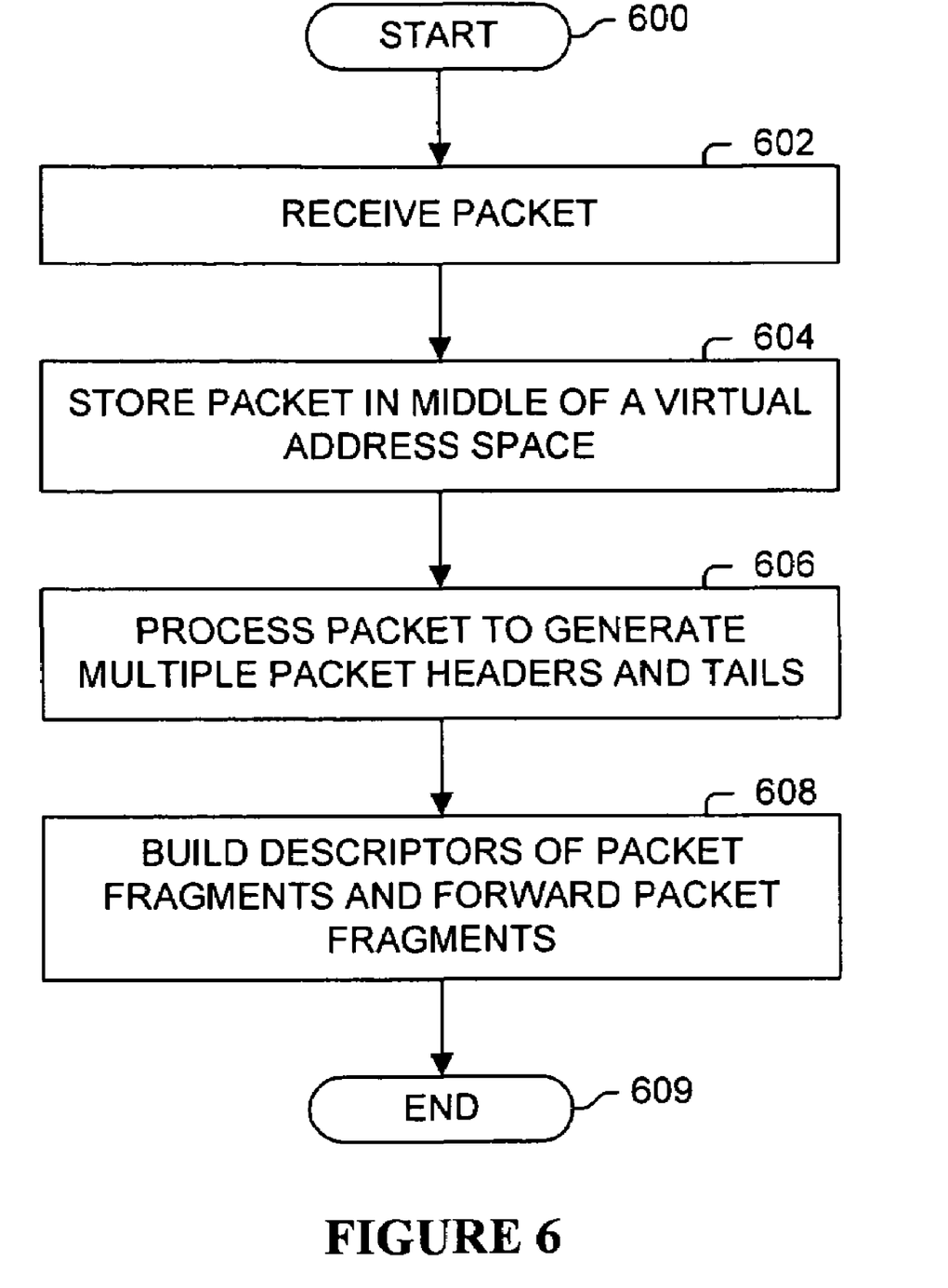
FIG. 6 is a flow diagram illustrating a process performed in one embodiment.

FIG. 6 is a flow diagram illustrating a process performed in one embodiment using the virtual storage system to store and manipulate packets. Processing begins with process block 600, and proceeds to process block 602, wherein a packet is received. In process block 604, the packet is stored in the middle of the corresponding virtual address space. In process block 606, the packet is processed to generate additional packet headers and tails. In process block 608, descriptors of the packet fragments are built, the packet contents retrieved to build the packet fragments, which are then forwarded. In one embodiment, these packet descriptors are forwarded to a packet gather mechanism for retrieving the packet contents based on these descriptors and forwarding the packet fragments. Processing is complete as indicated by process block 609. Of course, the process illustrated in FIG. 6 (and for that matter, that illustrated in the other figures) is only illustrative in nature, and not limiting as to the different types and manners of using an embodiment of a virtual storage system, including that for storing, manipulating, and retrieving packets.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for accessing storage, the method comprising:
    maintaining, by one or more processing elements, a plurality of storage segments linked together in a linked list data structure to represent a virtual contiguous block of storage to be accessed based on a virtual address within an address space corresponding to the virtual contiguous block of storage;
    maintaining, by said one or more processing elements, a plurality of virtual address to corresponding data segment pointer associations for directly identifying a data segment corresponding to a particular address within the address space, said associations including a plurality of dynamic recently used associations; and
    in response to an identified address in the address space:
    performing a lookup operation, based on the identified address, in the plurality of virtual address to corresponding data segment pointer association, the lookup operation designed to evaluate the plurality of dynamic recently used associations to identify a closest data segment pointer to a data segment which is closest, but prior in said linked list of the linked list data structure, to a particular data segment corresponding to the identified address;
    traversing the linked list data structure from the storage segment identified by the closest data segment pointer to the particular data segment;
    accessing data in the particular data segment; and
    updating, by said one or more processing elements, an association in the plurality of dynamic recently used associations to reflect said accessing data.

2. The method of claim 1, wherein said updated association includes the closest data segment pointer.

3. The method of claim 1, wherein said updated association does not include the closest data segment pointer.

4. The method of claim 1, wherein said accessing data includes accessing a last particular data segment; and wherein said updating the association includes identifying a particular association to update based on the last particular data segment, and updating the particular association.

5. The method of claim 1, including storing packet data, a plurality of packet headers and a plurality of packet tails in the virtual contiguous block of storage.

6. The method of claim 5, wherein said packet data is stored in a middle portion of the virtual contiguous block of storage; and said packet headers are stored before the middle portion and said packet tails are stored after the middle portion.

7. The method of claim 1, comprising maintaining a plurality of different address spaces including the address space, the address space being selected based on a context identifier.

8. An apparatus for accessing storage, the apparatus comprising:
    means for maintaining a plurality of storage segments linked together in a linked list data structure to represent a virtual contiguous block of storage to be accessed based on a virtual address within an address space corresponding to the virtual contiguous block of storage;
    means for maintaining a plurality of virtual address to corresponding data segment pointer associations for directly identifying a data segment corresponding to a particular address within the address space, said associations including a plurality of dynamic recently used associations; and
    means for performing operations in response to an identified address in the address space, said operations including:
    performing a lookup operation, based on the identified address, in the plurality of virtual address to corresponding data segment pointer associations, the lookup operation designed to evaluate the plurality of dynamic recently used associations to identify a closest data segment pointer to a data segment which is closest, but prior in said linked list of the linked list data structure, to a particular data segment corresponding to the identified address;
    traversing the linked list data structure from the storage segment identified by the closest data segment pointer to the particular data segment;
    accessing data in the particular data segment; and
    updating an association in the plurality of dynamic recently used associations to reflect said accessing data.

9. The apparatus of claim 8, wherein said updated association includes the closest data segment pointer.

10. The apparatus of claim 8, wherein said updated association does not include the closest data segment pointer.

11. The apparatus of claim 8, wherein said accessing data includes accessing a last particular data segment; and wherein said updating the association includes identifying a particular association to update based on the last particular data segment, and updating the particular association.

12. The apparatus of claim 8, including means for storing packet data, a plurality of packet headers and a plurality of packet tails in the virtual contiguous block of storage.

13. The apparatus of claim 12, wherein said packet data is stored in a middle portion of the virtual contiguous block of storage; and said packet headers are stored before the middle portion and said packet tails are stored after the middle portion.

14. The apparatus of claim 8, including means for identifying the address space of a plurality of address spaces based on a context identifier.

15. An apparatus for manipulating data including packets, the apparatus comprising:
    a packet processor configured to receive packets, store said packets in a virtual address storage system, to retrieve packets from the virtual address storage system, and to forward packets from the virtual address storage system; and the virtual address storage system, the virtual address storage system configured to (a) maintain a plurality of storage segments linked together in a linked list data structure to represent a virtual contiguous block of storage to be accessed based on a virtual address within an address space corresponding to the virtual contiguous block of storage; (b) maintain a plurality of virtual address to corresponding data segment pointer associations for directly identifying a data segment corresponding to a particular address within the address space, said associations including a plurality of dynamic recently used associations; and (c) in response to an identified address in the address space: to perform a lookup operation, based on the identified address, in the plurality of virtual address to corresponding data segment pointer associations, the lookup operation designed to evaluate the plurality of dynamic recently used associations to identify a closest data segment pointer to a data segment which is closest, but prior in said linked list of the linked list data structure, to a particular data segment corresponding to the identified address; traverse the linked list data structure from the storage segment identified by the closest data segment pointer to the particular data segment; access data in the particular data segment; and update an association in the plurality of dynamic recently used associations to reflect said accessing data.

16. The apparatus of claim 15, wherein said updated association includes the closest data segment pointer.

17. The apparatus of claim 15, wherein said updated association does not include the closest data segment pointer.

18. The apparatus of claim 15, wherein said accessing data includes accessing a last particular data segment; and wherein said updating the association includes identifying a particular association to update based on the last particular data segment, and updating the particular association.

19. The apparatus of claim 15, wherein the virtual address storage system is configured to maintain a separate said address space for a plurality of different context identifiers.

20. The apparatus of claim 15, wherein said storing said packets includes storing packet data, a plurality of packet headers and a plurality of packet tails in the virtual contiguous block of storage.

21. The apparatus of claim 20, wherein said packet data is stored in a middle portion of the virtual contiguous block of storage; and said packet headers are stored before the middle portion and said packet tails are stored after the middle portion.

* * * * *

UNITED STATES PATENT AND TRADEMARK OFFICE
CERTIFICATE OF CORRECTION

PATENT NO.        : 7,561,589 B2                                  Page 1 of 1
APPLICATION NO. : 11/065118
DATED             : July 14, 2009
INVENTOR(S)       : Shoham et al.

It is certified that error appears in the above-identified patent and that said Letters Patent is hereby corrected as shown below:

Col. 9, line 45, replace "association" with -- associations --

Signed and Sealed this

Twenty-second Day of September, 2009

David J. Kappos
*Director of the United States Patent and Trademark Office*